No. 654,378. Patented July 24, 1900.
D. BARCKDALL.
CARBURETER.
(Application filed Jan. 12, 1899.)
(No Model.) 2 Sheets—Sheet 1.
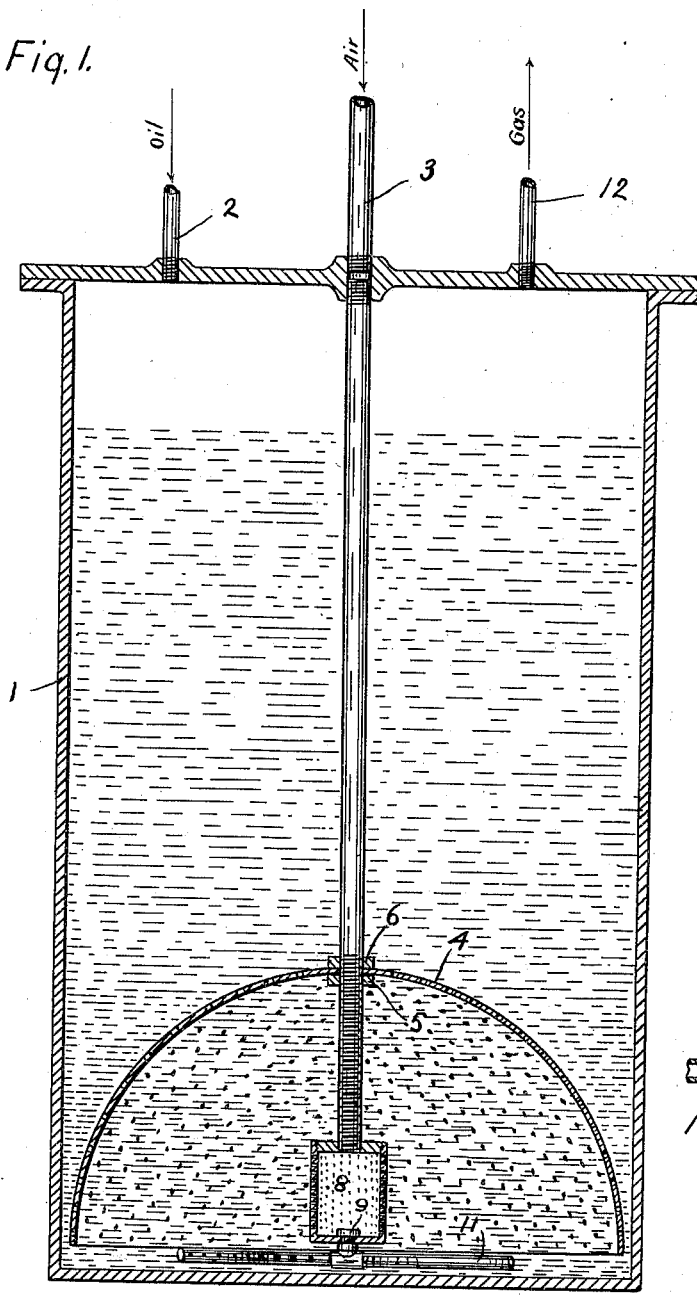
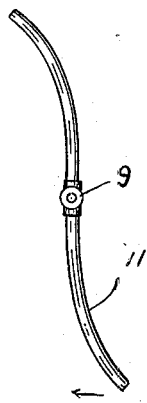
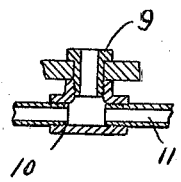
Witnesses
M. C. Buck.
R. D. Hawkins
Inventor
Daniel Barckdall
By V. H. Lockwood
His Attorney.

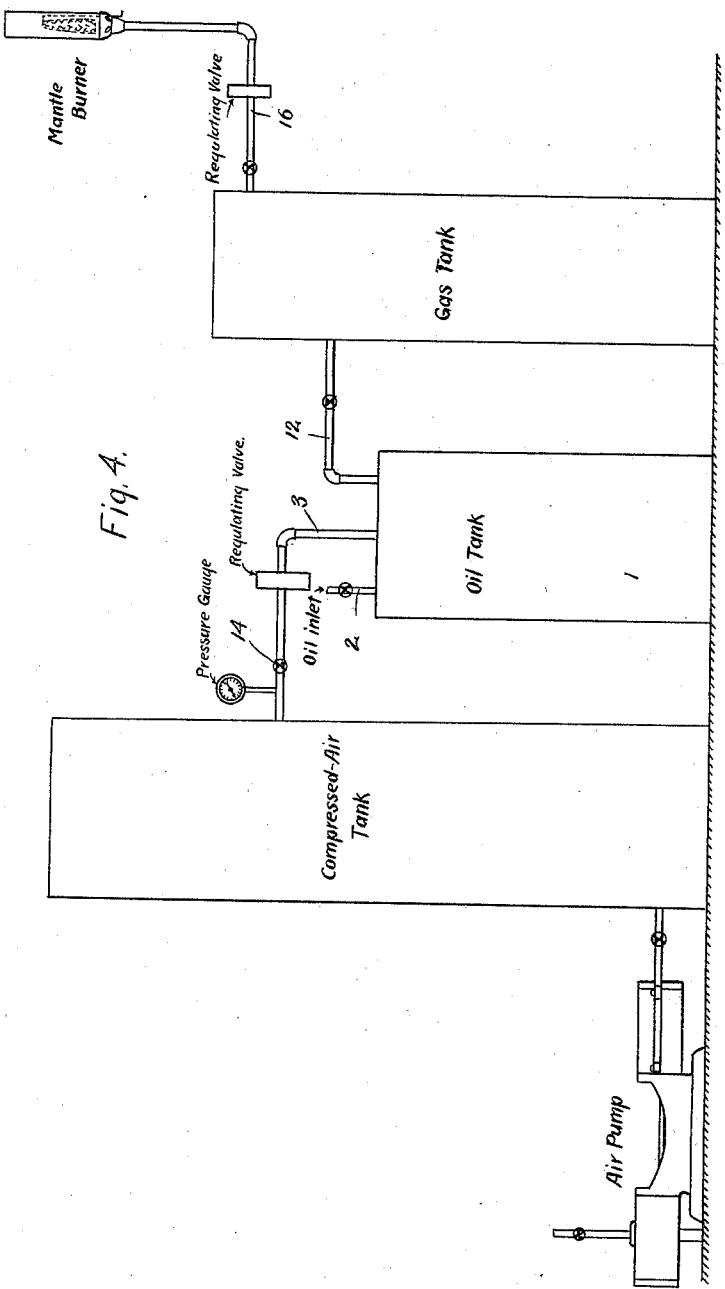

UNITED STATES PATENT OFFICE.

DANIEL BARCKDALL, OF INDIANAPOLIS, INDIANA, ASSIGNOR OF TWO-THIRDS TO WILLIS J. WOODWARD AND GUILFORD A. DEITCH, OF SAME PLACE.

CARBURETER.

SPECIFICATION forming part of Letters Patent No. 654,378, dated July 24, 1900.

Application filed January 12, 1899. Serial No. 701,988. (No model.)

*To all whom it may concern:*

Be it known that I, DANIEL BARCKDALL, of Indianapolis, county of Marion, and State of Indiana, have invented a certain new and useful Gas-Making Apparatus; and I do hereby declare that the following is a full, clear, and exact description thereof, reference being had to the accompanying drawings, in which like figures refer to like parts.

The object of said invention is to simplify the construction of machines of this character and to promote the better distribution of the air through the hydrocarbon.

In the drawings, Figure 1 is a central vertical section of the oil-tank. Fig. 2 is a plan of the rotary outlet-tube at the lower end of the air-inlet tube. Fig. 3 is a section of the connection between said outlet-tube and the air-inlet tube. Fig. 4 is a diagram of my gas-making apparatus.

In Fig. 4 the oil-tank 1 is shown with an oil supply or inlet pipe 2, regulated by a suitable valve. Entering said oil-tank there is an air-inlet pipe 3, leading from the compressed-air tank and provided with a shut-off valve 14 and a regulating-valve. There is also on the end next to the compressed-air tank a pressure-gage to indicate the pressure of the air in the compressed-air tank. The air is compressed in said tank by a suitable pump of any desired construction calculated to compress the air therein. The air-pipe 3 enters the tank centrally through its upper end, as seen in Fig. 1, and is provided with the means therein shown for distributing the air. The lower end of said pipe 3 is externally threaded and on it I mount a spherical disk 4, that is held in place by the nuts 5 and 6. Said disk is open at the bottom and its surface is perforated throughout.

The lower end of the air-inlet pipe 3 is enlarged and perforated. This is effected, preferably, as shown, by securing the enlarged portion 8 to the lower end of the main part of the pipe. As shown, this part 8 is a vessel with removable top and perforated sides. The bottom is closed, excepting the central aperture, through which the collared sleeve 9 extends downward and fits loosely enough to be rotatable. To this collared sleeve I secure a T 10, and in it I secure the oppositely-extending air-tubes 11. In this way a passage-way is provided into said tubes 11. These tubes 11 are S-shaped, being curved, substantially as shown, in opposite directions. The air is forced through the pipe 3 with considerable force, and a portion of it escapes through the perforations at the lower end of the pipe and the remainder, about half, proceeds to pass out into the tank through the tubes 11. As the air is forced through said tubes 11 because of their shape it causes them to rotate, and in this manner the portion of air which goes through them is distributed as it comes out. When properly operated, the pressure of the incoming air is sufficient to keep the enlarged portion 8 and the pipe 3, as well as the tubes 11, entirely clear of oil. It is thus seen that as the air issues from the lower end of the pipe it is quite well distributed; but to further distribute it in the oil and to cause it to be scattered into minute particles or quantities the disk 4 is so placed that substantially all such air will have to go through its perforations. As the air-outlet under such disk is arranged with relation to the disk the air will be caused to pass through the various parts of the disk equably. After the air has escaped through the perforations of such disk in minute quantities it continues to pass upward with great force through the body of the oil, and while passing out of the disk 4 and through the body of the oil by reason of its comminution the particles of air become carbureted. The gas thus is forced through the outlet-pipe 12. It is preferable to collect the gas thus formed in a reservoir or gas-tank, as shown in Fig. 4, and in such case the gas-pipe 12 would lead to said gas-tank, and from that tank the service-pipe 16 extends to the burner. A mantle-burner is required for light on account of the highly-volatile nature of the gas. For heating purposes any ordinary natural-gas burner may be used.

The service-pipe 16 is provided with a suitable shut-off valve and also with a regulating-valve for regulating the pressure of the gas that goes to the burner, so that the pressure of the gas as it goes through the burner may be fixed or modified regardless of the pressure of the gas in the gas-tank or as it comes from the oil-tank.

What I claim as my invention, and desire to secure by Letters Patent, is—

1. A gas-making apparatus including a hydrocarbon-tank, a main air-pipe extending into the tank, an S-shaped outlet-pipe so mounted centrally at the lower end of the main air-pipe as to be horizontally rotatable by the pressure of air and having a passageway from such main air-pipe through it, and means for forcing air through said main air-pipe and the carbureter.

2. A gas-making apparatus including a tank, a main air-pipe centrally extending into said tank, an enlarged portion or chamber at the lower end of said pipe with its sides perforated, an S-shaped outlet-pipe so mounted in the bottom of the enlarged portion or chamber as to be horizontally rotatable and have a passage from said chamber through it, and a perforated spherical disk so secured to the main pipe as to surround and inclose the enlarged portion or chamber.

In witness whereof I have hereunto affixed my signature in the presence of the witnesses herein named.

DANIEL BARCKDALL.

Witnesses:
M. C. BUCK,
AMANDUS N. GRANT.